United States Patent [19]
Kelling

[11] 3,833,847
[45] Sept. 3, 1974

[54] ANTI-BACKLASH SERVOMOTOR DRIVE SYSTEM

[75] Inventor: Leroy U. C. Kelling, Waynesboro, Va.

[73] Assignee: General Electric Company, Lynn, Mass.

[22] Filed: July 3, 1973

[21] Appl. No.: 378,931

Related U.S. Application Data

[63] Continuation of Ser. No. 159,750, July 6, 1971.

[52] U.S. Cl.......................... 318/630, 318/7, 318/48
[51] Int. Cl. ............................................. H02p 1/54
[58] Field of Search.......... 318/7, 8, 40, 45, 48, 630

[56] References Cited
UNITED STATES PATENTS

| | | | |
|---|---|---|---|
| 2,805,373 | 9/1957 | Bonnell............................ | 318/48 X |
| 2,805,375 | 9/1957 | Morgan................................ | 318/48 |
| 3,117,262 | 1/1964 | Mullin.................................. | 318/7 |
| 3,444,445 | 5/1969 | Mullin.................................. | 318/7 |
| 3,501,682 | 3/1970 | Jacoby.................................. | 318/7 |
| 3,704,401 | 11/1972 | Miller................................... | 318/7 |

Primary Examiner—B. Dobeck

[57] ABSTRACT

A two servomotor drive system wherein the servomotors generate (1) opposing torques at or near standstill to take up backlash in a rack and pinion drive, and (2) additive torques at other velocities. Two servomotor circuits, each comprising a servomotor connected in series with a diode, are connected across the output terminals of a servomotor drive signal source. The diodes conduct in opposite directions. The servomotor-diode junctions in the two circuits are connected by a saturating reactor. At and near standstill, the drive signal source generates alternating current pulses which cause opposing torques to be produced by the two servomotors. At higher velocities, the drive signal is a pulsating DC signal which is applied to one of the servomotors directly and to the other of the servomotors through the saturated reactor to cause the motors to produce additive torques.

4 Claims, 10 Drawing Figures

INVENTOR.
LEROY U.C. KELLING
BY
HIS ATTORNEY

INVENTOR.
LEROY U.C. KELLING
BY Gerald R Woods
HIS ATTORNEY

ANTI-BACKLASH SERVOMOTOR DRIVE SYSTEM

This is a continuation of application Ser. No. 159,750, filed July 6, 1971.

BACKGROUND OF THE INVENTION

The present invention relates to the art of motor control and more particularly to the art of controlling a pair of servomotors in a rack and pinion drive to take up backlash at and near standstill while producing additive torques at greater velocities.

On an automatic machine tool, servomotors are used to control the position of a workpiece relative to a cutting tool in response to control signals generated in a numerical control. By moving the machine tool table and/or a cutting tool along several axes at desired velocities, a desired contour can be machined in the workpiece. Machining operations in such a machine tool are often programmed to an accuracy of 0.0001 inches. To achieve such accuracy, backlash in the mechanical linkages between the servomotors and the machine tool table or toolholder must be taken up at the start and finish of table or toolholder motion.

To take up backlash in a rack and pinion drive, one prior art drive system utilizes two servomotors which continuously generate opposing torques. The function of one servomotor, referred to as the leading servomotor, is to drive the rack in a desired direction at a desired velocity. The function of the other servomotor, referred to as the trailing servomotor, is to exert a countertorque on the rack so as to continuously bias the rack into contact with the pinion of the leading servomotor. Generally, the trailing servomotor is energized so as to generate a constant opposing torque.

The leading servomotor must be large enough to overcome the continuous drag of the trailing servomotor while satisfying the velocity and/or position command imposed upon it by the numerical control. Since either motor may be the leading servomotor, depending on the direction in which the rack is to be driven, both servomotors in such an anti-backlash arrangement are larger and, therefore, more costly than the servomotor which could be used in a single servomotor arrangement. At the same time, the torque curve of the described servomotor arrangement is not as good as the torque curve of a single equally large servomotor since the torque of the leading servomotor is always offset by the amount of the countertorque generated by the trailing servomotor and the torque required to accelerate the trailing servomotor.

SUMMARY OF THE INVENTION

The present invention is a two servomotor drive wherein smaller and less costly servomotors can be used to provide a torque curve which is better than the torque curve of either of the servomotors taken along. A drive signal source in this system produces a drive signal having a polarity which is determined by the commanded direction of movement of the member driven by the drive system and a magnitude which is determined by the commanded velocity of the driven member. The system further includes first and second servomotor circuits, each having a servomotor connected in series with a rectifier. The rectifiers are poled to conduct current in opposite directions. The servomotor-rectifier junctions in the servomotor circuits are connected through an impedance means which conducts current from one junction to the other as a function of the commanded velocity of the driven member. At and near standstill, the impedance means is substantially non-conducting while alternating current pulses are applied to the first and second servomotor circuits. The servomotors generate opposing torques which take up backlash. At greater velocities, the impedance means conducts, allowing direct current pulses to be applied to both servomotors. Under these conditions, the servomotors produce additive torques.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

Figure 1:
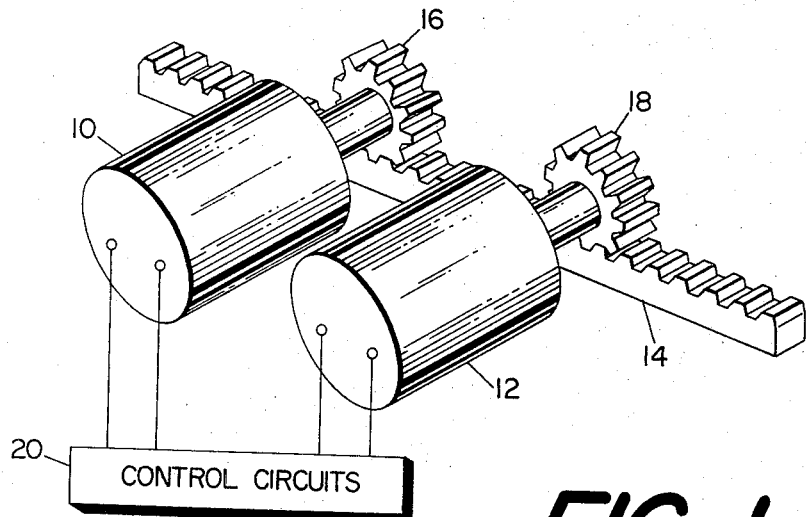
FIG. 1 is a perspective view of the basic mechanical arrangement of two servomotors in a rack and pinion anti-backlash drive.

Referring now to FIG. 1, a two servomotor drive system is shown wherein servomotors 10 and 12 are used to drive a rack 14 by means of pinion gears 16 and 18 on the output shafts of motors 10 and 12, respectively. Although the pinions are shown as being mounted on the motor shafts, a gear box is normally interposed to reduce the motor shaft speeds. The servomotors 10 and 12, shown as being under the control of control circuits 20, are commonly referred to as leading and trailing servomotors. This designation is a functional one which describes the role of the servomotor. The function of the leading servomotor, which may be either servomotor 10 or servomotor 12, is to provide the torque which moves the rack 14 in the correct direction at the commanded velocity. The function of the trailing servomotor, which would be the other of the servomotors, is to provide an opposing torque which tends to bias the rack 14 against the teeth of the pinion gear of the leading servomotor, thereby taking up any backlash which might otherwise occur between the gear 16 and the rack 14.

Figure 2:
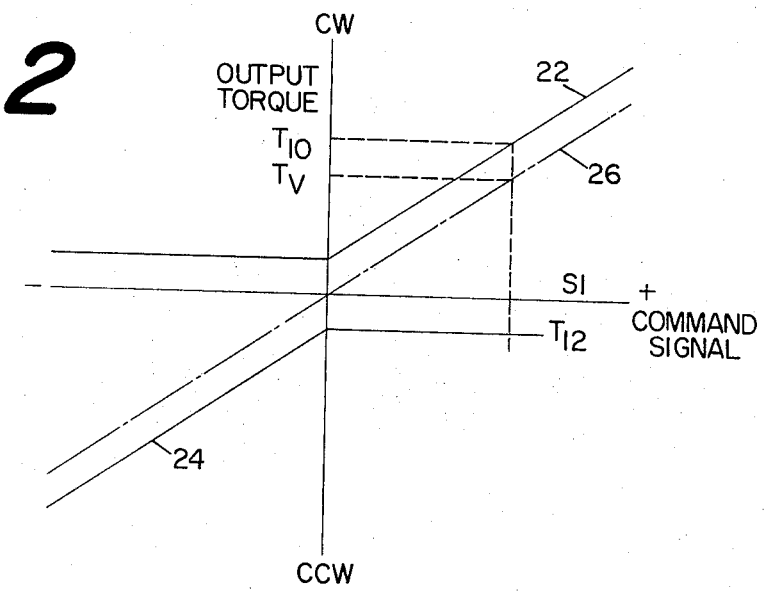
FIG. 2 shows torque curves for each servomotor and the resultant torque of a two servomotor drive system controlled in accordance with prior art techniques.

Referring now to FIG. 2, the output torques versus input signals for a prior art control system are shown. Curve 22 represents the torque characteristic of servomotor 10, and curve 24 represents the torque characteristics of servomotor 12. For any given value of command signal, the resultant torque, shown as curve 26, is the algebraic sum of the torques generated by servomotors 10 and 12. For example, for a positive command signal $S_1$, a clockwise torque $T_{10}$ generated by leading servomotor 10 is offset by a counterclockwise torque $T_{12}$ generated by trailing servomotor 12 to yield a resultant torque $T_r$. In the prior art system, the torque generated by the trailing servomotor is constant and continuous. For example, for all positive command signals, servomotor 12, as the trailing servomotor, produces a constant counterclockwise torque $T_{12}$ which opposes the clockwise torque produced by leading servomotor 10. The resultant torque for all values of input signals is, therefore, less than the torque of the leading servomotor taken alone as is shown by the resultant torque curve 26 in FIG. 2.

Figure 3:
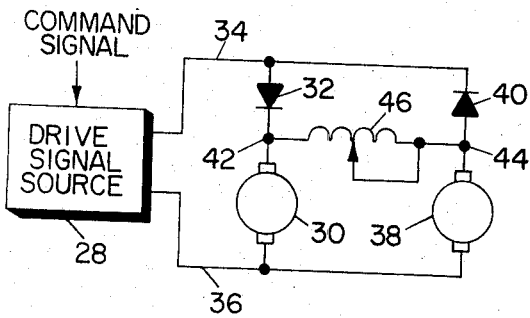
FIG. 3 is a schematic diagram of a two servomotor drive system constructed and controlled in accordance with the present invention.

Referring now to FIG. 3, wherein a drive system constructed in accordance with the present invention is illustrated, a drive signal source 28 is shown in block diagram form only. Drive signal source 28 includes reversing controlled rectifier circuits which supply a pulsating alternating current signal to single or parallel drive motors at standstill or low drive velocities. Due to overlap current, the single or parallel drive motors produce pulsating opposing torques which make the drive responsive to small signals. In this invention, adjustment of the magnitude of the overlap current determines the magnitude of the countertorques produced by a pair of servomotors as well as the range of torques and speeds over which the countertorques will be generated. At higher velocities, pulsating direct current signals are produced by source 28. A circuit having the described output is disclosed in U.S. Pat. No. 2,653,289 - Kelling.

A first servomotor circuit comprising a servomotor 30 and a diode rectifier 32 is connected across output terminals 34 and 36 of the drive signal source 28. A second servomotor circuit comprising a second servomotor 38 connected in series with a second diode rectifier 40 is connected in parallel with the first servomotor circuit between terminals 34 and 36. The diodes 32 and 40 are poled to conduct current in opposite directions; that is, positive current flows from terminal 34 to terminal 36 through diode 32 and servomotor 30 whereas negative current flows from terminal 36 to terminal 34 through servomotor 38 and diode 40. The junction 42 of servomotor 30 and diode 32 is connected to the junction 44 of servomotor 38 and diode 40 by an impedance means which preferably comprises an adjustable saturating reactor 46.

Figure 4:
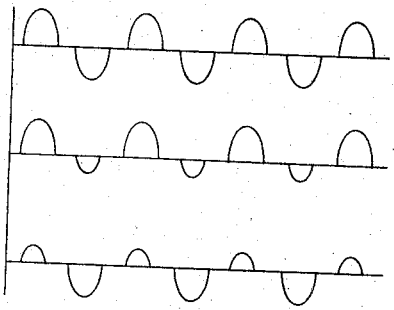
FIG. 4, consisting of FIGS. 4a through 4c, depicts waveforms generated in the system illustrated in FIG. 3 at standstill.

The alternating current pulses produced by the drive signal source 28 when the system is at and near standstill are of sufficiently short duration and sufficiently low voltage that the reactor 46 remains unsaturated. Under these conditions, referred to hereafter as a first set of conditions, reactor 46 allows very little current to pass between junctions 42 and 44. Positive current pulses applied to servomotor 30 through diode 32 and negative current pulses applied to servomotor 38 through diode 40 causes these motors to produce opposing torques. FIG. 4a represents the output of the drive signal source 28 when the system is at or near standstill and wherein symmetrical alternating current pulses of relatively low voltage levels are generated. FIG. 4b shows the current in servomotor 30 and FIG. 4c shows the current in servomotor 38 when the applied current is as shown in FIG. 4a. FIG. 4 shows that when positive current is driven through diode 32 substantially all of the current flows through servomotor 30 and, due to the high impedance of reactor 46, very little positive current flows through servomotor 38. On the other hand, when negative current flows through diode 44 substantially all of the current flows through servomotor 38 and, due to the high impedance of reactor 46, very little negative current flows through servomotor 30. When the servomotors 30 and 38 are controlled in this manner, they will generate opposing torques.

Figure 5:
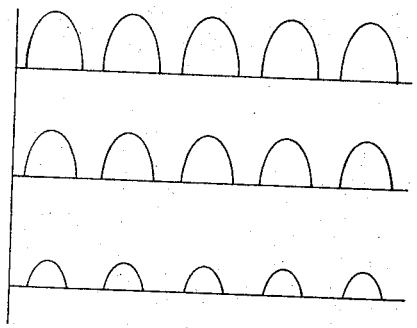
FIG. 5, consisting of FIGS. 5a through 5c, depicts waveforms generated in the system illustrated in FIG. 3 during certain rack movements.

When the rack driven by servomotors 30 and 38 is to move at velocities greater than a certain minimum velocity, the output of drive signal source 28 changes to direct current pulses having a polarity related to the commanded direction of movement of the driven member and a magnitude related to the commanded velocity of the driven member. FIG. 5a shows positive current pulses which could be produced by the drive signal source 28. As may be seen in FIG. 5b, these pulses are applied to servomotor 30 through forward-biased diode 32 in the form of current pulses having substantially the same magnitude and duration as the pulses generated by source 28.

As the commanded velocity increases, the magnitude and duration of the current pulses produced by drive signal source 28 also increases until the reactor 46 saturates, thereby lowering the impedance to current flow between junctions 42 and 44. When the reactor 46 is saturated, current splitting takes place at junction 42 with the greater positive current being applied to servomotor 30 and the lesser positive current being applied to servomotor 38 through the saturated reactor 46. Since the servomotors 30 and 38 are both energized by positive current pulses, the torques generated are additive at all velocities greater than a certain minimum velocity.

Similarly, negative current pulses produced at velocities greater than the minimum velocity are applied both to servomotor 38 and to servomotor 30. The negative current path through servomotor 30 includes saturated reactor 46 and diode 40.

Figure 6:
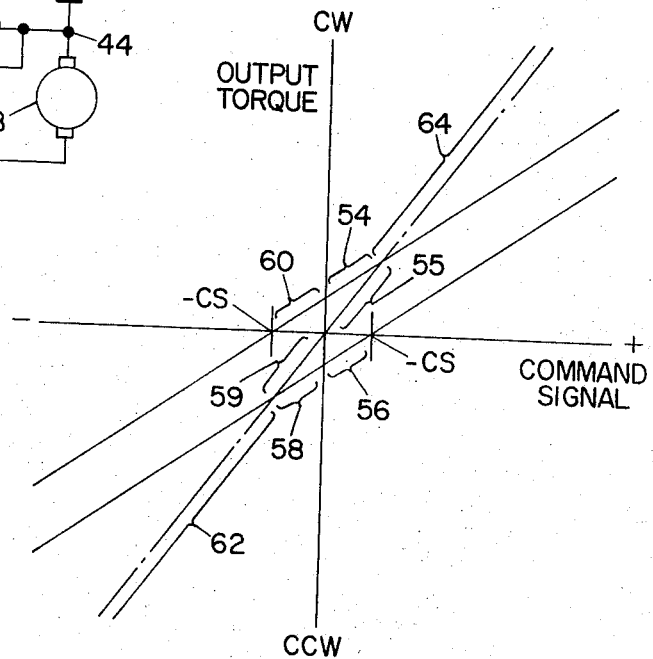
FIG. 6 is the torque curve of the two servomotor drive system illustrated in FIG. 3.

The torque curves 50 and 52 of servomotors 30 and 38, respectively, are illustrated in FIG. 6 along with the resultant torque curve 66. Unlike prior art arrangements wherein a servomotor produces a command-dependent torque while acting as a leading servomotor and a small constant torque while acting as a trailing servomotor, both servomotor 30 and servomotor 38 produce torques proportional to the magnitude and polarity of the command signal throughout the entire range of command signal values.

For command signals having values between zero and +CS, the drive signal source 28 generates alternating current pulses wherein the positive current pulses are of greater magnitude and duration than the negative current pulses. As a result, servomotor 30 generates a clockwise torque (segment 54 of torque curve 50) which is offset by a counterclockwise torque (segment 56 of torque curve 52) generated by servomotor 38. The resultant torque (segment 55) is, therefore, less than the torque of servomotor 30 for command signals in this range. A similar situation exists for command signals having values between zero and a −CS value with the counterclockwise torque (segment 58 of curve 52) being offset by the clockwise torque (segment 60 of curve 50) to yield a resultant torque 59. The first set of conditions referred to above are bounded by the command signals ±CS.

For command signals more negative or more positive than the signals −CS and +CS, both of the servomotors 30 and 38 are energized by current of the same polarity. Therefore, the torques generated by these motors are additive and the combined torque response of the servomotors is greater than the torque response of either servomotor taken along. The conditions under which additive torques are generated are the second set of conditions. The resultant torque curve generated under this second set of conditions is shown by segments 62 and 64 of the resultant torque curve 66.

Since the torque curves are additive once the command signal exceeds a certain minimum value, servomotors 30 and 38 may be smaller and, therefore, have less inertia than the servomotor(s) in a single servomotor drive or a prior art two servomotor drive.

While an impedance means consisting of a saturating reactor 46 is used in a preferred embodiment of the invention, other impedance means might be used. For example, a number of diodes having relatively high breakdown voltages might be connected in series between junctions 42 and 44. Similarly, a variable resistor might be connected between the two junctions. The saturating reactor is preferred over either of these arrangements since less heat is generated by such a reactor.

Also, while electrical servomotors and control circuits for such motors have been illustrated, it should be understood that pneumatic or hydraulic equivalents of such equipment are considered to be within the scope of the present invention.

While there has been described in detail what is thought to be preferred embodiment of the invention, modifications in addition to those described above may occur to those skilled in the art once they become familiar with the invention. Therefore, it is intended that the appended claims shall be construed as including all such variations and modifications as fall within the true spirit and scope of the invention.

I claim:

1. An anti-backlash servomotor drive system comprising:
   a. a drive signal source for producing a drive signal having a polarity determined by the commanded direction of movement and having an amplitude determined by the commanded velocity of a driven member;
   b. a leading servomotor circuit connected to output terminals of the drive signal source comprising a first servomotor connected in series with a rectifier poled to conduct current from a first to a second of the output terminals;
   c. a trailing servomotor circuit connected in parallel with the leading servomotor circuit comprising a second servomotor connected in series with a rectifier poled to conduct current from the second to the first of the output terminals; and
   d. impedance means connecting the servomotor-rectifer junctions of the leading and trailing servomotor circuits responsive to a predetermined amplitude of the drive signal for selectively conducting current to the trailing servomotor, the current being of the same polarity as current being applied to the leading servomotor and having a magnitude related to the commanded velocity of the driven member.

2. A servomotor drive system as recited in claim 1 wherein the drive signal source produces a train of current pulses with the polarity of each pulse being determined by the commanded direction of movement of the driven member and with the amplitude and the duration of each pulse being determined by the commanded velocity of the driven member.

3. A servomotor drive system as recited in claim 2 wherein the impedance means comprises a saturating reactor.

4. An anti-backlash dual servomotor drive system wherein pinions coupled to the shafts of the servomotors drive a moveable rack member, said drive system comprising.
   a. a drive signal source for producing alternating current pulses under a first set of conditions and direct current pulses under a second set of conditions, the polarity and duration of the direct current pulses being functions, respectively, of the commanded direction and commanded velocity of rack movement;
   b. a first servomotor circuit connected to output terminals of said drive signal source comprising a first servomotor connected in series with a first diode poled to conduct current from a first to a second of the output terminals;
   c. a second servomotor circuit connected in parallel with said first servomotor circuit comprising a second servomotor connected in series with a second diode poled to conduct current from the second to the first of the output terminals;
   d. a saturating reactor connecting the servomotor-diode junctions in said first and second servomotor circuits, said saturating reactor acting to prevent current flow between the junctions under the first set of conditions and acting to permit current flow between the junctions under the second set of conditions.

* * * * *